April 21, 1953  W. HEUSSER  2,635,932
PISTON RING ASSEMBLY FOR THE PISTONS
OF INTERNAL-COMBUSTION ENGINES
Filed March 28, 1949
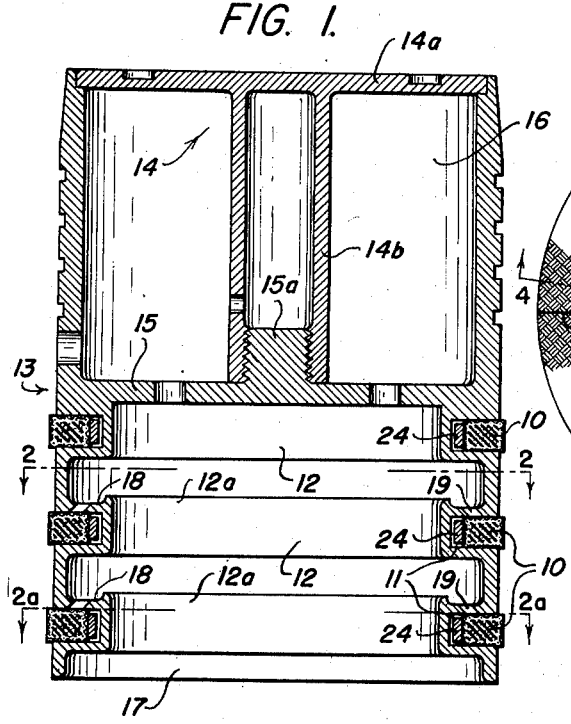
FIG. 1.
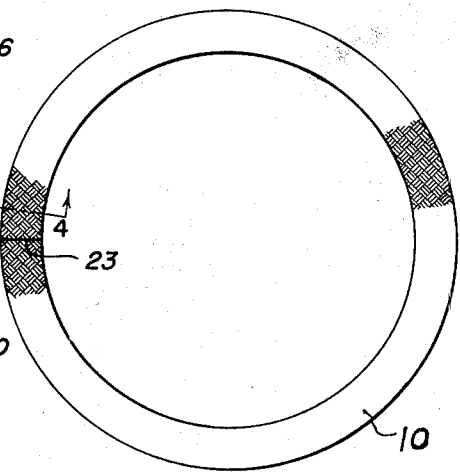
FIG. 3.
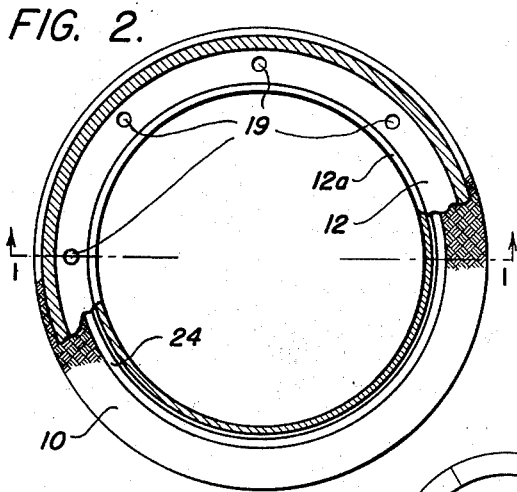
FIG. 2.
FIG. 4.
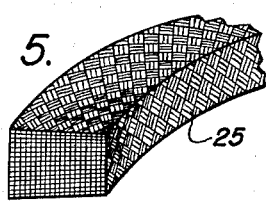
FIG. 5.
FIG. 6.
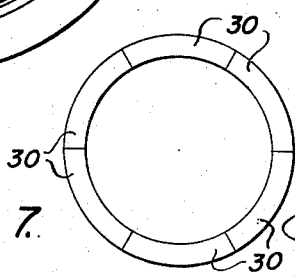
FIG. 7.
Inventor:
WILFRID HEUSSER,
Attorneys.

Patented Apr. 21, 1953

2,635,932

UNITED STATES PATENT OFFICE 2,635,932

PISTON RING ASSEMBLY FOR THE PISTONS OF INTERNAL-COMBUSTION ENGINES

Wilfrid Heusser, Salt Lake City, Utah

Application March 28, 1949, Serial No. 83,846

4 Claims. (Cl. 309—22)

This invention relates to internal combustion engine piston ring assemblies.

As presently constructed, the piston and piston ring assemblies of internal combustion engines leave much to be desired. Though intended to insure adequate lubrication of the cylinder walls against which they operate, they perform this task ineffectively, which leads to wear of the piston rings and to scoring and wear of the cylinder walls. Such wear means that lubricating oil from the crankcase will creep up between pistons and cylinder walls into the combustion chambers, interfering with engine performance and leading to the deposition of damaging carbon on operating parts, while, similarly, gas from the combustion chambers will seep down to the crankcase and dilute the lubricating oil. Consequently, piston rings must be renewed several times during the operating life of an internal combustion engine, and, if a reasonably long operating life of the engine is to be obtained, cylinders must be rebored and refitted with oversize pistons when wear of cylinder walls becomes excessive.

By this invention I have overcome these difficulties to the extent of insuring greatly extended life of piston rings, and of practically eliminating the need for reboring cylinders and refitting with oversize pistons. The operating life of an internal combustion engine is greatly prolonged, and performance thereof is considerably improved.

In accordance with my invention, I utilize piston rings which are made of a soft and flexible material as compared with the surfaces against which they slide, being more in the nature of packing, yet preserving true piston ring characteristics. Thus, any inherent tendency of the piston rings toward scoring the cylinder walls is eliminated. Furthermore, I provide for continuous lubrication of such rings from the interior of the piston during operation of the engine, the rings themselves contributing, by reason of their unique construction, to the proper working distribution of the lubricating oil.

This is in contrast to conventional practice of employing hardened steel, cast-iron, and similar types of piston rings, which must depend for lubrication upon picking up sufficient oil from the cylinder walls during operation of the engine.

The necessary outward expansion of such soft and flexible piston rings in a pressure fit against the cylinder walls along which they slide, is advantageously obtained by strongly resilient ring inserts between piston ring and piston, such ring inserts being preferably of spring steel or berillium copper.

The soft and flexible piston rings are fabricated in such a manner as to have a porosity of structure which aids in the retention and distribution of lubricant, the individual pores intercommunicating substantially throughout the body of the piston ring so seepage of lubricating oil is obtained from oil-receiving surfaces of the rings to oil-applying surfaces thereof. Thus, the piston rings may be regarded as wicks in the lubricating process.

An excellent example of such wick-type of structure is presented by a piston ring fabricated by braiding or otherwise weaving strands of soft metal wire, such as copper, babbit metal, or the like, the interstices between the wire strands providing for passage of lubricating oil.

The entire piston ring may be made up of such braided metal wire, compressed to provide structural strength and operative coherence, or a core of braided and compressed asbestos fibers may be sheathed or jacketed by a covering of such braided wire. In this latter instance, the metal sheathing or jacket serves a highly useful purpose in preventing undesirable localized bulging of the asbestos when the latter becomes unduly softened under the heat of operating conditions.

While it is obviously impractical to cite here all the materials which may be utilized in the fabrication of suitable wick-type piston rings, generally speaking it may be said that any heat and oil resistant material having the requisite softness and flexibility may be employed in braided, woven, or other porous forms wherein the pores are suitably intercommunicative to provide for lubricating oil seepage as herein specified. In those instances where the material is affected by operative heat to such an extent as to interfere with proper operation, as in the instance of the softening and localized bulging of asbestos, a core of such may be sheathed or jacketed by a suitable metal wire or other porous-formed covering not subject to such difficulty.

It is generally found more satisfactory in practice, and is therefore preferred, to make the wall thickness or radial width of the piston ring considerably greater than the axial depth thereof, so as to provide opposite transverse bearing areas which are broad relative to the rim or cylinder wall-contacting portion of the ring. This affords a maximum of structural and operational strength for the ring and provides for adequate oil-supply surface relative to the oil-delivery or applying surface. Furthermore, the broad bearing areas enhance the sealing characteristics of the ring. Due to the inherent nature of these piston rings, they may if desired be made up of arcuately-formed individual segments enabling alteration in diameter by the replacement of one or more of such segments by others of greater or less length.

I prefer to locate the piston rings in the piston skirt as far from the piston head as is possible consistent with operative stability of the particular piston construction concerned. In accordance with the disclosure of my copending application Serial No. 78,698 filed February 28, 1949 for Piston for Internal Combustion Engine I locate the rings entirely or almost entirely in the lower half of the piston skirt, where they are protected to a maximum extent from the excessive heat of the combustion chamber, the upper portion of the piston skirt being preferably provided with a series of oil-retaining annular channels.

The piston rings are advantageously positioned within receiving grooves or channels formed externally of the piston, but extending internally of the piston within respective annular housings which form, in effect, ribs projecting internally of the hollow piston. Such annular housings are provided, circumferentially, with respective sets of openings affording flow communication for splash lubricant from the interior of the piston to piston ring surfaces within the ring-receiving grooves or channels. Thus, during operation of the engine, there is a continual flow of oil from the interior of the piston to the exterior thereof. Where operating conditions permit, as in most automotive engines as distinguished from radial engines for aircraft, the upper surfaces of the annular ring housings within the piston are cupped to serve as oil reservoirs, the flow passages to the exterior of the piston leading from below the normal liquid level of such oil reservoirs so oil will flow to the exterior of the piston by gravity.

Principal objects of the invention, therefore, are:

To prolong the operating life and improve the performance of internal combustion engines;

To almost entirely eliminate the need for piston ring and piston replacements;

To provide an improved piston and piston ring assembly, whereby adequate lubrication during operation will be effected and scoring of cylinder walls eliminated;

To provide an improved piston ring construction in connection with the above whereby lubrication of the cylinder walls will be effected at the same time that leakage of oil and gas past the rings is prevented to an extraordinary degree.

Further objects and features of the invention will become apparent from the following detailed description of the presently preferred specific embodiments illustrated in the accompanying drawing by way of concretely exemplifying the novel concepts involved rather than by way of limitation.

In the drawing:

Fig. 1 represents a central longitudinal section taken through one form of piston and piston ring assembly of the invention;

Fig. 2, a composite horizontal section taken partially on the line 2—2 and partially on the line 2a—2a of Fig. 1;

Fig. 3, a plan view of one of the piston rings shown in Fig. 1;

Fig. 4, a cross-section taken on the line 4—4 of Fig. 3;

Fig. 5, a fragmentary perspective of another possible form of the piston ring of the invention;

Fig. 6, a fragmentary vertical section of a somewhat different structural arrangement of piston and piston ring in accordance with the invention.

Fig. 7, a plan view corresponding to that of Fig. 3 but drawn to a considerably reduced scale and showing a piston ring in accordance with the invention made up of individual arcuate segments.

Referring to the drawing: as illustrated in Fig. 1, the piston and piston ring assembly preferably takes the form disclosed in my aforementioned copending application Serial No. 78,698, wherein the piston rings are concentrated in the lower portion of the piston skirt.

Thus, piston rings 10, which are soft and flexible as compared with conventional piston rings and the cylinder wall surfaces against which the rings slide, are mounted within receiving recesses 11 formed externally of the piston by a series of annular housings 12 which project internally of the piston in the form of circumferential ribs.

The illustrated piston is a preferred type constructed in two pieces, namely, a hollow tubular piece 13 forming the piston skirt, and a piston head piece 14 embodying a head plate 14a and a depending, hollow tubular stem 14b.

The interior of the piston skirt 13 is divided transversely by an operatively imperforate web 15, which has a central stud 15a to which the stem 14b of the piston head piece 14 is threaded. In this way, an upper heat-insulating chamber 16 and a lower lubrication chamber 17 are formed within the body of the piston.

The annular housings 12 which serve to receive the piston rings, are, it should be noted, located within the lower lubricating chamber 17 whose bottom is open to the splash of lubricating oil from the crankcase of the engine.

Furthermore, where the piston is to operate with its head uppermost, as is customary in most automobile engines, it is preferred that the annular housings 12, where practical, be provided with raised circumferential lips 12a on their upper surfaces, thereby defining respective superficial reservoirs 18 for catching and retaining splash lubricating oil. Openings or passages 19, arranged at intervals and in respective sets circumferentially of the annular housings 12, extend from a low level in the reservoir, usually the bottom thereof, to an outlet in the piston-ring-receiving recesses 11 externally of the piston, thereby serving to conduct splash-lubricating oil from the interior of the piston directly to the bearing surfaces of piston rings 10.

As aforementioned, the piston rings are specially formed to effectively distribute the flow of lubricating oil, here from passages 19, to the cylinder walls of the engine along which the rings slide.

Each piston ring 10 possesses the soft and flexible characteristics of packing materials so as not to score the cylinder walls, and are formed to provide intercommunicating pores so as to operate as a wick and effect a thorough distribution of lubricating oil. In the present instance, each comprises a core 10a of compressed asbestos fibers or similar heat and oil resistant material braided or otherwise suitably woven or matted to provide an intercommunicating-pore formation, and an outer, tight-fitting sheathing or jacket 10b of braided or woven wire mesh or otherwise porous-formed body of a suitable soft metal, preferably copper. The many interstices of braided copper wire serve admirably to pass oil from passages 19 both to the core 10a and directly to the working face 20 of the piston ring, where it effectively lubricates, in essentially wick-fashion, during operation of the engine. In this instance the porous nature of the core is a distinct advantage in aiding oil retention and distribution.

The piston ring is preferably considerably broader at its radially-extending bearing surfaces 21 than at its inner and outer rim surfaces, to provide for both piston ring strength and oil reception. Furthermore, it has been found highly advantageous to make the bearing surfaces 5 slope inwardly of the ring somewhat from outer rim or working face 20 to inner rim 22, whereby installation of the ring is facilitated and a substantially rectangular formation is assumed when installed.

A single piston ring 10 fits into each receiving recess 11, and is so constituted as to form a substantially perfect circle when its ends 23 are brought together following installation of the ring in its receiving recess, it being noted that the entire ring when constructed in accordance with the invention is sufficiently flexible to undergo the necessary opening out thereof for installation purposes without substantial structural deformation. A resilient steel expander ring 24 is inserted in the recess 11 between the bottom thereof and the piston ring 10, and by its outward pressure produces the required pressure contact of the working face 20 of the piston ring against the cylinder walls.

Instead of providing a sheathed or jacketed core construction for the piston ring, the entire ring may be formed of braided or otherwise woven soft metal wire, such as the copper wire specified in the case of piston ring 10, or wire of babbit metal, or the like, which is compressed sufficiently to provide a dense yet intercommunicating-pore structure. Thus, as illustrated in Fig. 5, the piston ring 25 is of the same configuration as piston ring 10, but is formed entirely of braided wire. This results in a very satisfactory porous structure due to the numerous small interstices between the wires, which provide for excellent distribution of received lubricating oil in essentially wick fashion.

In Fig. 6 is fragmentarily illustrated another form of piston and piston ring assembly pursuant to the invention, wherein the annular housings which extend internally of the piston and define the piston-ring-receiving recesses are not provided with oil receiving and retaining reservoirs as in the embodiment of Fig. 1. As shown in the said Fig. 6, openings or passages 26 for the inflow of lubricating oil from the interior of the piston to the piston ring 27 are provided through the several defining walls of the annular housing 28. This type of piston and piston ring assembly is intended for use where the piston operates in such a manner that oil would not be caught and retained by the reservoir of the preceding embodiment, as, for instance, in radial-type aircraft engines. In this embodiment it is usually advantageous to provide a greater number of openings in each set than where a reservoir-formation is utilized.

While it is preferred that the general piston construction be that illustrated in Fig. 1, wherein a transverse web divides the hollow interior of the piston into heat-insulating and lubricating chambers and the piston rings are concentrated in the lower portion of the piston skirt, the novel lubricating feature of the present invention may be utilized in any conventional or other piston construction as found advantageous. In certain instances, conventional piston rings may be used on part of a piston, while the rings of the invention are used on other parts, though the greatest benefits will be derived from use of the rings of the invention entirely and in the manner here illustrated.

Due to the inherent nature of the rings of the invention they may be of composite formation, made up of a number of arcuately-formed individual segments, as illustrated at 30 in Fig. 7. This gives the advantage of being able to alter the diameter of the ring at will by merely replacing one or more of the segments. Because of the relative softness and cohesiveness of the material making up the ring, adjacent ends of adjoining segments will form a sufficiently tight union for all practical purposes. An expansion ring corresponding to those indicated at 24 in Fig. 1 is similarly employed with the composite piston ring of this embodiment.

It should be noted that with all the illustrated forms of piston rings pursuant to the invention the smaller diameter of the inner circumferential portion of the annular body as compared with the outer circumferential portion means that the pores will be progressively more open, and thus better able to channel oil, from the inner rim to the outer working rim thereof. Further, it should be noted that the degree of porosity in any given instance is determined by the degree of compression to which the ring is subjected during formation.

Whereas the invention is here illustrated and described with respect to certain presently preferred embodiments thereof, it should be understood that various changes may be made therein and various other forms may be constructed on the basis of the teachings hereof, by those skilled in the art, without departing from the protective scope of the following claims.

I claim:

1. A piston ring for internal combustion engine pistons, comprising an annular body of essentially piston ring formation, said body comprising a core of heat and oil resistant material having an intercommunicative pore structure which is open to the superficial surfaces of said core, and an external jacket of intermeshed strands of a heat resistant, soft metal wire, said body forming a lubricating wick.

2. A piston ring according to claim 1, wherein the core is also made up of intermeshed strands of a heat resistant soft metal wire.

3. A piston ring according to claim 1, wherein the core is made up of a compressed mass of asbestos-like material.

4. A piston ring according to claim 1, wherein the body is made up of a plurality of arcuately-formed individual segments.

WILFRID HEUSSER.

References Cited in the file of this patent
UNITED STATES PATENTS

| Number | Name | Date |
| --- | --- | --- |
| 131,645 | Williams | Sept. 24, 1872 |
| 214,083 | Beardmore | Apr. 8, 1879 |
| 1,092,834 | Haas | Apr. 14, 1914 |
| 1,259,292 | Riedler | Mar. 12, 1918 |
| 1,304,360 | Norwood | May 20, 1919 |
| 1,467,256 | Thomson | Sept. 4, 1923 |
| 1,495,773 | Brown | May 27, 1924 |
| 1,743,023 | Carter | Jan. 7, 1930 |
| 2,092,086 | Saharoff | Sept. 7, 1937 |
| 2,396,018 | Mis | Mar. 5, 1946 |
| 2,419,192 | Anderson | Apr. 22, 1947 |